US011795991B2

(12) United States Patent
Clark et al.

(10) Patent No.: US 11,795,991 B2
(45) Date of Patent: Oct. 24, 2023

(54) COMPENSATING FASTENER ASSEMBLY

(71) Applicant: Illinois Tool Works Inc., Glenview, IL (US)

(72) Inventors: Chad Michael Clark, Stamping Ground, KY (US); Ronald C. Owens, II, Lawrenceburg, KY (US); Jason Paradis, Bristol, CT (US); Sean M. O'Reilly, Lexington, KY (US)

(73) Assignee: Illinois Tool Works Inc., Glenview, IL (US)

( * ) Notice: Subject to any disclaimer, the term of this patent is extended or adjusted under 35 U.S.C. 154(b) by 241 days.

(21) Appl. No.: 17/361,679

(22) Filed: Jun. 29, 2021

(65) Prior Publication Data

US 2022/0003264 A1 Jan. 6, 2022

Related U.S. Application Data

(60) Provisional application No. 63/048,326, filed on Jul. 6, 2020.

(51) Int. Cl.
*F16B 43/00* (2006.01)
*F16B 41/00* (2006.01)

(52) U.S. Cl.
CPC ................... *F16B 41/002* (2013.01)

(58) Field of Classification Search
CPC .................................................... F16B 41/002
USPC ........................................................ 411/533
See application file for complete search history.

(56) References Cited

U.S. PATENT DOCUMENTS

| | | | | |
|---|---|---|---|---|
| 1,952,102 A | * | 3/1934 | Sproul | F16F 13/02 213/29 |
| 2,121,784 A | * | 6/1938 | Busby | F16B 41/002 411/105 |
| 3,052,942 A | * | 9/1962 | Mulvaney | F16B 41/002 411/347 |
| 3,087,591 A | * | 4/1963 | Whitney | F16D 41/066 192/45.02 |
| 3,861,661 A | * | 1/1975 | Yazaki | B60G 15/04 267/202 |
| 4,915,557 A | * | 4/1990 | Stafford | F16B 5/0208 411/258 |
| 5,042,880 A | * | 8/1991 | Garuti | F16B 41/002 411/386 |
| 8,740,199 B2 | * | 6/2014 | Takeda | F16F 3/06 267/179 |
| 9,303,664 B2 | * | 4/2016 | Keech | B23P 19/084 |
| 10,982,787 B2 | * | 4/2021 | Glime, III | F16K 27/0236 |
| 2003/0210951 A1 | * | 11/2003 | Alden, III | F16B 35/041 403/230 |
| 2004/0156669 A1 | * | 8/2004 | Lejeune | F01D 25/16 403/2 |

(Continued)

*Primary Examiner* — Gary W Estremsky
(74) *Attorney, Agent, or Firm* — Quarles & Brady LLP

(57) ABSTRACT

A compensating fastener assembly is configured to secure a fastener to a surface element. The compensating fastener assembly includes a compression limiter having a cylindrical main body and a flange, the cylindrical main body defining a channel and a longitudinal axis. The compensating fastener assembly further includes a spring defining a central passage. The central passage of the spring is configured to receive the main body of the compression limiter such that a first end of the spring is configured to be disposed adjacent the flange of the compression limiter.

18 Claims, 8 Drawing Sheets

(56) References Cited

U.S. PATENT DOCUMENTS

| | | | |
|---|---|---|---|
| 2009/0191976 A1* | 7/2009 | Wang | F16B 5/0208 |
| | | | 470/2 |
| 2009/0313804 A1* | 12/2009 | Wang | F16B 5/0208 |
| | | | 29/525.11 |
| 2015/0267730 A1* | 9/2015 | He | F16B 5/0208 |
| | | | 411/352 |
| 2017/0043868 A1* | 2/2017 | Sequera | B64D 45/00 |
| 2018/0038405 A1* | 2/2018 | Clark | F16B 5/0241 |
| 2018/0094667 A1* | 4/2018 | Clark | F16B 21/06 |

* cited by examiner

COMPENSATING FASTENER ASSEMBLY

RELATED APPLICATIONS

This application relates to and claims priority benefits from U.S. Provisional Patent Application No. 63/048,326, filed Jul. 6, 2020, which is incorporated by reference in its entirety herein.

FIELD OF THE DISCLOSURE

Embodiments of the present disclosure generally relate to a compensating fastener assembly, and more particularly, to a fastener assembly that may be configured to accommodate a variety of installations and allow movement between components of the assembly.

BACKGROUND

In various applications, fastener assemblies are used when securing components together or mounting components to a structure. For example, a fastener assembly may be used to secure a first component, such as a panel, to a second component, such as a vehicle frame to which the panel is configured to be secured. In some installations, the assembly may be required to accommodate misalignment or movement between the components it secures. Additionally, the fastener assembly may experience multi-directional loading in addition to extreme atmospheric conditions, such as, e.g., extreme temperatures and frequent contact with dirt, dust, oil, or the like. Consequently, fastener assemblies, particularly in automotive installations, may be subject to corrosion and failure. Therefore, a need exists for a compensating fastener assembly that can tolerate extreme conditions while maintaining effective performance and enhanced life-length, and further being configured for easy and efficient installation.

SUMMARY

In one aspect, the present disclosure provides a compensating fastener assembly that may be configured to secure a fastener to a surface element. The compensating fastener assembly may include a compression limiter and a spring. The compression limiter may include a main body and a flange, the main body defining a channel and a longitudinal axis. The spring may define a passage and may be configured to receive the main body of the compression limiter such that a first end of the spring is configured to disposed adjacent the flange of the compression limiter.

Further, the compensating fastener assembly can be configured to be secured to a surface element having an opening and the main body of the compression limiter may be configured to be inserted into the opening. The main body of the compression limiter can include a recessed region, and a second end of the spring may be configured to be received by the recessed region. The spring is configured to be compressed between the flange and a retention feature of the main body of the compression limiter.

In addition, the compensating fastener assembly can be configured to receive a fastener in the channel of the compression limiter, and the spring may be configured to contact and be retained between the fastener and the flange. In some examples, the spring may be a conical wire spring, and the first end of the spring can have an outer diameter greater than an outer diameter of a second end of the spring.

In another aspect, a fastener assembly includes a compression limiter having a main body extending between a first end and a second end opposite the first end, a flange extending radially outward from the second end, and an outer rim spaced apart from the flange and facing a top surface of the flange. A spring can define a central passage between an upper end and a lower end opposite the upper end. The spring may be configured to be axially aligned with the main body and the upper end of the spring can be configured to be disposed adjacent the outer rim of the compression limiter. The first end of the main body can have an outer diameter that is greater than an outer diameter of a remainder of the main body. In some examples, a surface element may be disposed between the lower end of the spring and the flange of the compression limiter. The lower end of the spring can be located proximate an opening of the surface element, and the spring may be compressed between the outer rim and the surface element.

In some examples, a fastener includes a head and a shaft extending from the head, the shaft being configured to be at least partially inserted through the compression limiter such that a gap can be formed between the shaft and the compression limiter. The upper end of the spring may be configured to abut the head of the fastener. Further, the flange of the compression limiter can define an outer diameter that is at least twice the outer diameter of the main body, and the outer diameter of the flange may be greater than a distance between the first end and the second end of the compression limiter.

In still another aspect, a fastener assembly includes a compression limiter having a main body defining a channel therethrough and a flange extending radially outwardly from an end of the main body. Further, the fastener assembly includes a spring having an upper end and a lower end, with the upper end of the spring being configured to be disposed adjacent the main body and a surface element being configured to be disposed between the spring and the compression limiter.

In some embodiments, the main body of the compression limiter is configured to be received through an opening of the surface element. Further, a gap may be formed between the main body and an inner surface of the opening of the surface element. In some aspects, a fastener may be configured to be inserted through the channel of the compression limiter and an outer diameter of the fastener can be greater than an inner diameter of the channel. Moreover, the fastener can include a shaft extending from a head, the shaft being configured to be at least partially inserted through the channel of the main body such that a gap is formed between the shaft and the main body. The spring can be configured to be compressed between the head of the fastener and the flange of the compression limiter. Further, the spring is configured to be axially aligned with the channel of the compression limiter.

Figure 1:
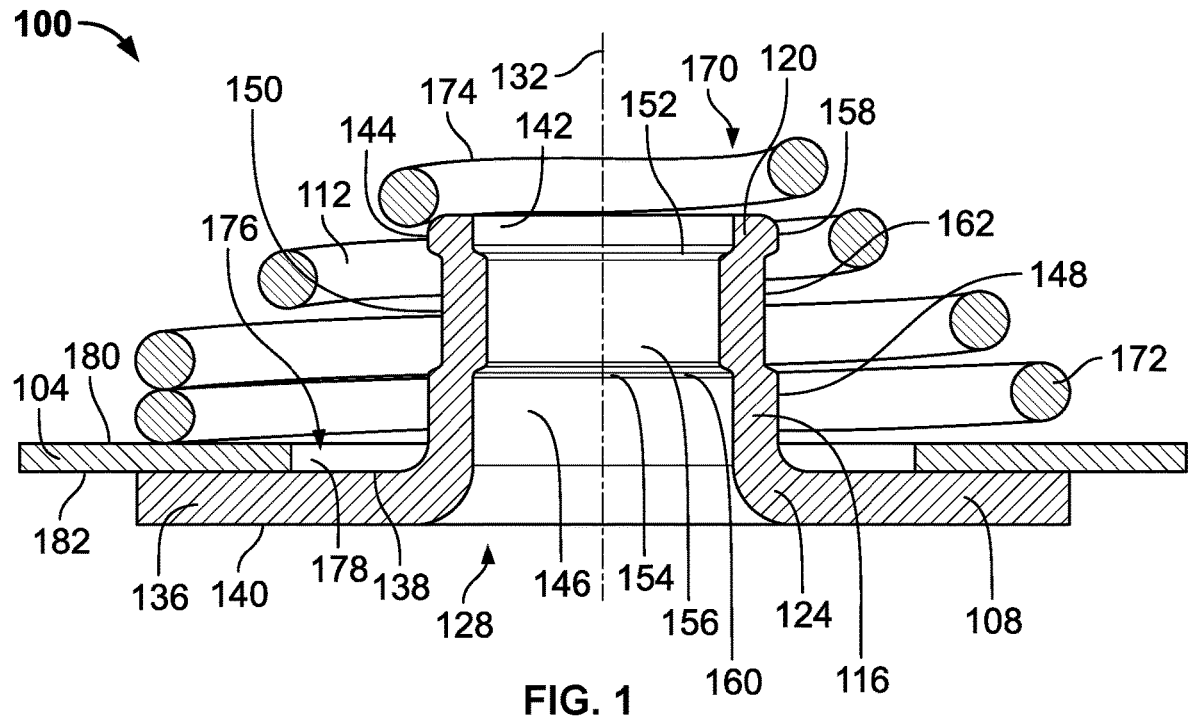
FIG. 1 is a cross-sectional view of a compensating fastener assembly, which includes a compression limiter and a spring, being secured to a surface element according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter, and equivalents thereof as well as additional items and equivalents thereof.

DETAILED DESCRIPTION

Aspects of the present disclosure provide a compensating fastener assembly that is configured to be used to mate components of an assembly. For example, the compensating fastener assembly according to the present disclosure may be particularly useful when mating a bolt with a panel or other component.

Figure 2:
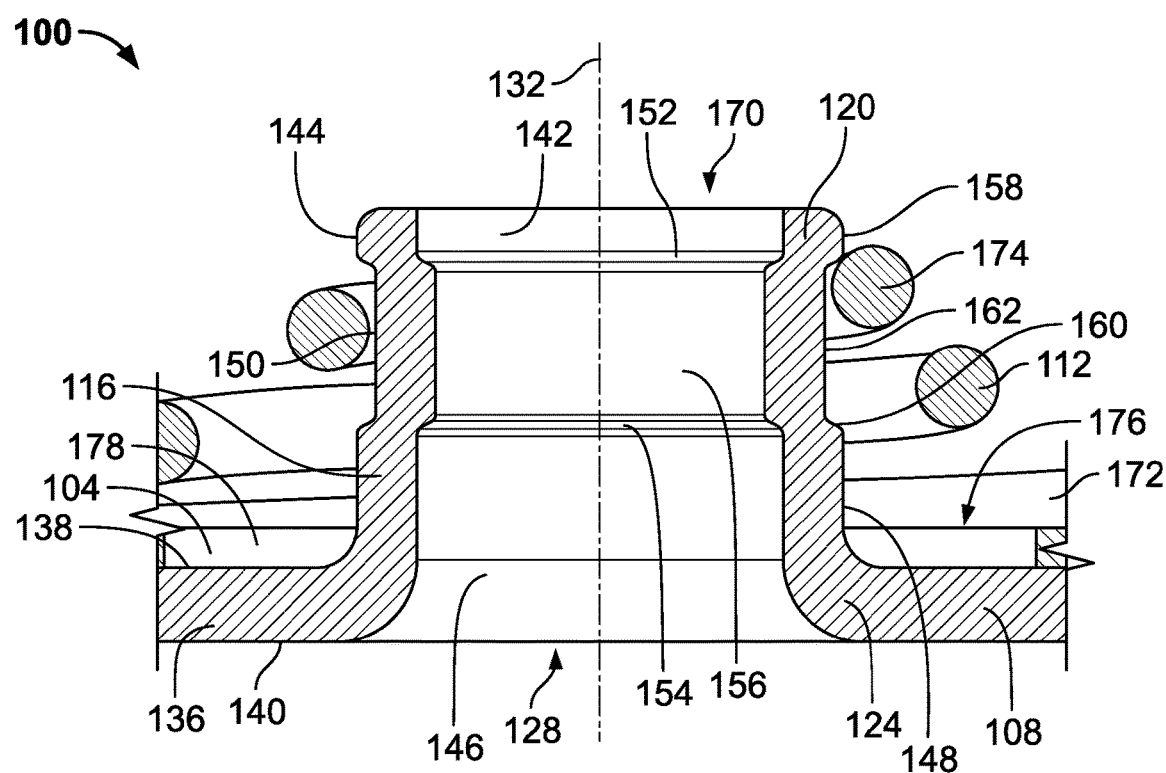
FIG. 2 is a cross-sectional view of the compensating fastener assembly of FIG. 1 secured to the surface element.

FIGS. 1 and 2 illustrate a compensating fastener assembly 100 that is configured to be secured to a surface element 104, such as, e.g., a panel or heat shield on an automobile. As will be described further below, the compensating fastener assembly 100 may be configured to receive a fastener, such as, e.g., a bolt or stud, that can be used to secure the surface element 104 to another component, such as, e.g., another panel or a vehicle frame. In the illustrated embodiment, the compensating fastener assembly 100 includes a compression limiter 108 and a spring 112.

Figure 3:
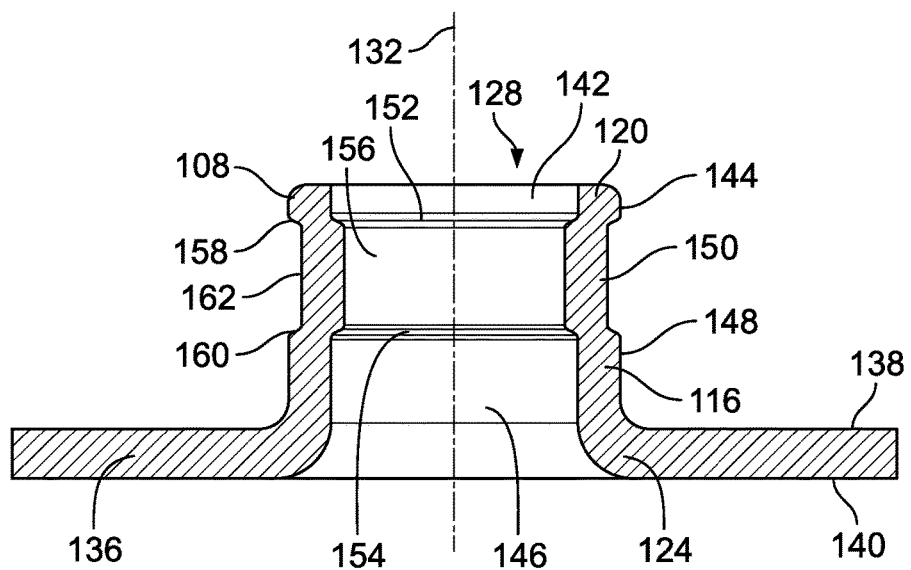
FIG. 3 is a cross-sectional view of the compression limiter of FIG. 1.

As illustrated in FIG. 3, the compression limiter 108 is a bushing that includes a main body 116 or tubular wall having a generally cylindrical shape with a first end 120 and a second end 124 opposite the first end 120. The compression limiter 108 further includes a central channel 128 that extends through the main body 116, passing through the first end 120 and the second end 124, and a longitudinal axis 132 extends axially and centrally through the central channel 128. A flange 136 extends radially outwardly from the second end 124 of the main body 116 and includes a top surface 138 and a bottom surface 140 opposite the top surface 138. Optionally, the top surface 138 may be smooth and uninterrupted, as illustrated in the embodiment of FIG. 3. Alternatively, the top surface 138 may be include indicia, a texture, a pattern, a raised central area, a raised outer area or the like. For example, the top surface 138 may have annular ribs for locating the spring 112, or for increasing frictional resistance with the surface element 104.

Still referring to FIG. 3, the first end 120 includes an interior surface 142 that at least partially defines the channel 128 and an exterior surface 144. The first end 120, including the interior surface 142 and the outer surface 144, is generally cylindrical and forms an annular ring located opposite the second end 124 of the main body 1116. The interior surface 142 can be smooth and uninterrupted with a generally constant inner diameter along a direction parallel to the longitudinal axis 132. The main body 116 further includes an interior surface 146 that at least partially defines the channel 128 proximate the second end 124 and an exterior surface 148. In the embodiment illustrated, the main body 116 further includes a recessed region 150, which is a region having a reduced inner and outer diameter, located between the first end 120 and the second end 124. That is, in the recessed region 150, the channel 128 has a reduced cross-sectional area as compared to the remainder of the channel 128. As illustrated in FIG. 3, a wall thickness, i.e., a difference between the outer diameter and the inner diameter, of the main body 116 in the recessed region 150 is approximately equivalent to a wall thickness of the remainder of the main body 116, such as, e.g., along the first end 120. In some examples, the wall thickness of the main body 116 may be reduced in the recessed region 150 as compared to the remainder of the main body 116. Additionally or alternatively, the wall thickness of the main body 116 may vary radially about the longitudinal axis 132. In some examples, the wall thickness of the main body 116 may vary along a direction parallel to the longitudinal axis 132. Accordingly, a cross-sectional area of the main body 116 may be constant between the first end 120 and the second end 124, or the cross-sectional area may vary along a direction parallel to the longitudinal axis 132. Further, the cross-sectional area of the main body 116 may be different in the recessed region 150 than in the remainder of the main body 116.

In some embodiments, in the recessed region 150, an inner diameter of the cylindrical main body 116 is smaller than an inner diameter of the remainder of the main body 116. Inside the channel 128, the recessed region 150 includes an upper ramp 152 and a lower ramp 154 connected by an inner recess surface 156. The upper ramp 152 extends inwardly relative to the longitudinal axis 132 at an angle from the interior surface 142 of the first end 120, and the lower ramp 154 extends outwardly relative to the longitudinal axis 132 at an angle between the inner recess surface 156 and the interior surface 146 of the main body 116. Outside of the channel 128, the recessed region 150 includes an upper rim 158 and a lower rim 160 connected by an outer recess surface 162. The upper rim 158 extends inwardly relative to the longitudinal axis 132 at an angle between the exterior surface 144 of the first end 120 and the outer recess surface 162, and the upper rim 158 is spaced apart from the flange 136 and faces the top surface 138 of the flange 136. The lower rim 160 extends outwardly relative to the longitudinal axis 132 at an angle between the outer recess surface 162 and the exterior surface 148 of the main body 116.

Accordingly, the central channel 128 narrows in diameter between the first end 120 and the recessed region 150 and widens between the recessed region 150 and the second end 124. Further, in the recessed region 150, an outer diameter of the cylindrical main body 116 is smaller than an outer diameter of the remainder of the main body 116. The recessed region 150 may be spaced apart from both the flange 136 and the first end 120 of the compression limiter 108. In the embodiment illustrated, the recessed region 150 is located closer to the first end 120 of the cylindrical main body 116 than the second end 124 thereof and a distance between the upper rim 158 and the lower rim 160 is less than a distance between the lower rim 160 and the top surface 138 of the flange 136; however, alternative embodiments may include one or more recessed regions of various sizes and positioned at various locations along the main body. It is contemplated that the recess region 150 may be asymmetrical about the longitudinal axis 132, such that the recess region 150 takes a shape different that of the main body 116, such as being triangular-, rectangular-, elliptical-, or polygonal-shaped. It is further contemplated that the recess region 150 may define concave or convex curvatures relative to the longitudinal axis 132. Moreover, alternative embodiments may omit the recessed region.

Figure 4:
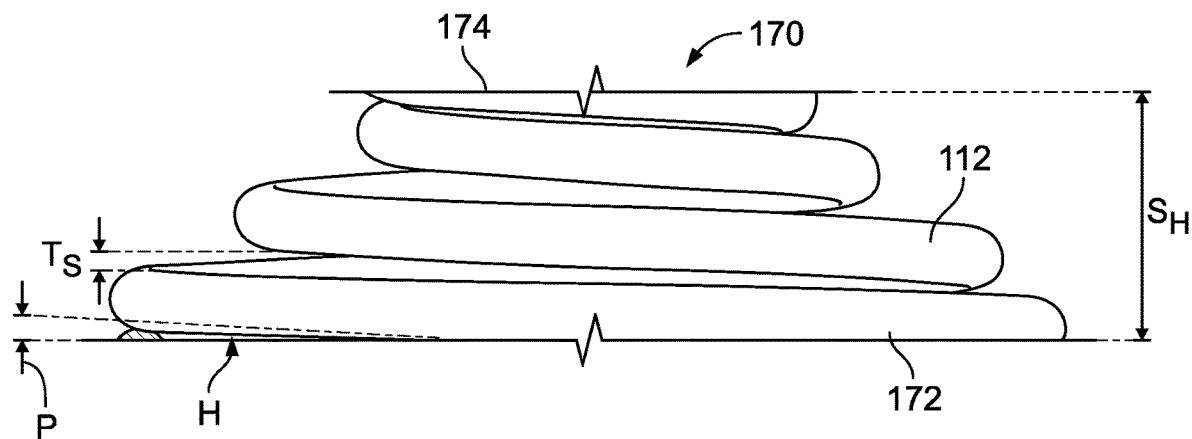
FIG. 4 is a front elevational view of the spring of FIG. 1.

Turning now to FIG. 4, in the present embodiment, the spring 112 is a conical or frusto-conical wire spring that defines a central passage 170 therethrough. For example, the spring 112 includes a first end or lower end 172 and a second end or upper end 174, the first end 172 having a diameter greater than the second end 174 so that both an outer diameter and an inner diameter of the spring 112 gradually decreases in size from the first end 172 to the second end 174. The spring 112 has a spring constant "k" that can be manipulated by several features, such as having greater or fewer turns, i.e., when the wire travels 360°, or the use of different materials, or varying a thickness or diameter of the wire, or increasing or decreasing an axial spacing $T_S$ between each turn, or increasing or decreasing a pitch P, i.e., an angle at which each turn is disposed relative to a horizontal plane H. Further, the spring has a height $S_H$ defined between the first end 172 and the second end 174. Although FIG. 4 shows the first end 172 and second end 174 having a machined flat finish, alternative embodiments may include springs having different end finishes. For example, the ends may be round, rectangular, square, etc.

Returning to FIGS. 1 and 2, the spring 112 is generally configured to receive and secure to the compression limiter 108. More specifically, the main body 116 of the compression limiter 108 is configured to be axially aligned along the longitudinal axis 132 with and inserted into and through the central passage 170 of the spring 112. Preferably, the compression limiter 108 is inserted into the spring 112 so that the first end 120 of the compression limiter 108 is adjacent the second end 174 of the spring 112 and, accordingly, the second end 124 (i.e., the flange 136) of the compression limiter 108 is disposed adjacent the first end 172 of the spring 112. Thus, the larger first end 172 of the spring 112 may rest on, contact, or abut the top surface 138 of the flange 136 of the compression limiter 108. Additionally, the compensating fastener assembly 100 can be assembled with the surface element 104 so that the main body 116 of the compression limiter 108 is inserted through an opening 176 defined by an inner surface 178 so that the first end 172 of the spring 112 may rest on, contact, or abut the surface element 104, and so the surface element 104 may be disposed between the spring 112 and the compression limiter 108.

For example, before the spring 112 and the compression limiter 108 are joined together, the surface element 104 may be arranged or positioned between the spring 112 and the compression limiter 108. The compression limiter 108 may be arranged so that the main body 116 thereof extends into and through the opening 156 of the surface element 104, and a top surface 180 is configured to face away from the flange 136 while the bottom surface 182 of the surface element 104 is configured to face the flange 136. It will be appreciated that the flange 136 has an outer diameter greater than a diameter of the opening 176, such that the flange 136 can prevent the compression limiter 108 from passing entirely through the opening 176. In some examples, the outer diameter of the flange 136 may be greater than approximately twice the size of the outer diameter of the main body 116, and, optionally, greater than a distance between the first end 120 and the second end 124 of the compression limiter 108. The central passage 170 of the spring 112 may then receive the main body 116 of the compression limiter 108. Consequently, the surface element 104 is disposed, clamped, or otherwise sandwiched between the flange 136 of the compression limiter 108 and the first end 172 of the spring 112, as seen in FIG. 2.

The compensating fastener assembly 100 may be configured such that the spring 112 and the compression limiter 108 may be locked, snapped, or otherwise securely fastened together. More specifically, still referring to FIG. 2, the recessed region 150 of the compression limiter 108 is provided to receive and retain the second end 174 of the spring 112. That is, during assembly/installation, the spring 112 may be compressed until the second end 174 of the spring 112 snaps into the recessed region 150 and the second end 174 of the spring 112 pushes against or abuts the upper rim 158 of the recessed region 150, as shown in FIG. 2. Accordingly, an inner diameter of the first end 172 of the spring 112 is preferably greater than or equal to an outer diameter of the main body 116 at the recessed region 150, and the inner diameter of the second end 174 of the spring 112 is preferably less than an outer diameter of the main body 116.

When secured, the spring 112 may be at least partially compressed, and the compression limiter 108 and the spring 112 together clamp the surface element 104 in place. The ability to secure the spring 112 to the compression limiter 108 may be particularly useful for packaging and shipping. That is, the compensating fastener assembly 100 may be secured to a structure, such as the surface element 104 shown in FIG. 2, prior to being shipped to a customer as a subassembly. Thus, by incorporating the compensating fastener assembly 100 into a subassembly, installation may be eased and occurrences of lost parts may be diminished. Although the spring 112 snappably secures to the compression limiter 108 in the present embodiment, compensating fastener assemblies according to alternative embodiments may use alternative means of fastening the components. For example, threads, adhesives, locking elements, additional elements, such as nuts, and/or the like may be used to secure the spring to the compression limiter.

Figure 5:
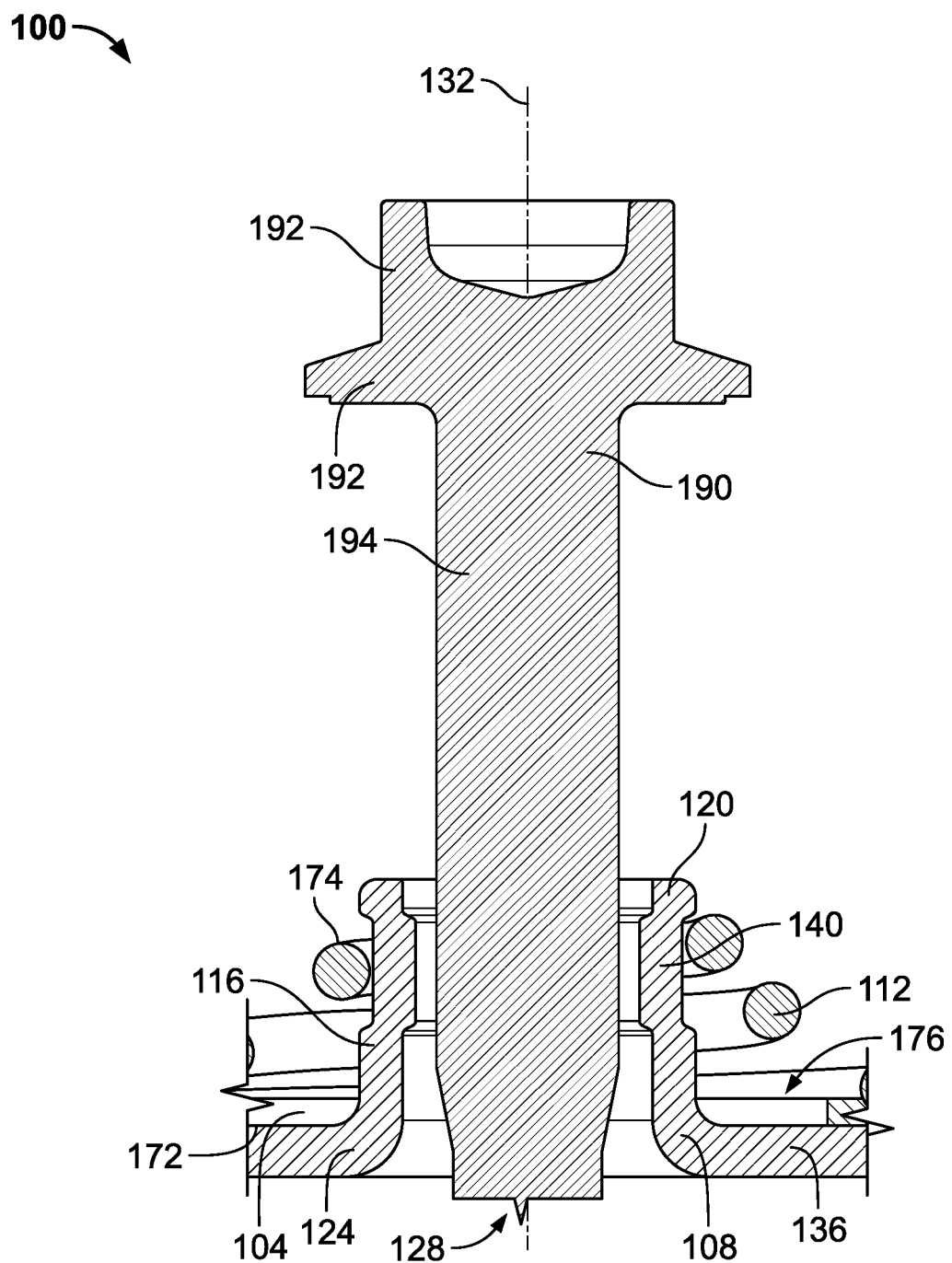
FIG. 5 is a cross-sectional view of the compensating fastener assembly and surface element of FIG. 1 receiving a fastener.

Turning now to FIG. 5, the compensating fastener assembly 100 may be configured to receive and retain a fastener 190, such as a bolt or stud. In the illustrated embodiment, the fastener 190 is a bolt that includes a head 192 and a shaft 194. The shaft 194 of the fastener 190 may comprise external threads (not shown) on at least a portion thereof. The fastener 190 is configured to be inserted into and through the channel 128 of the compression limiter 108, as well as through the opening 176 of the surface element 104.

Figure 6:
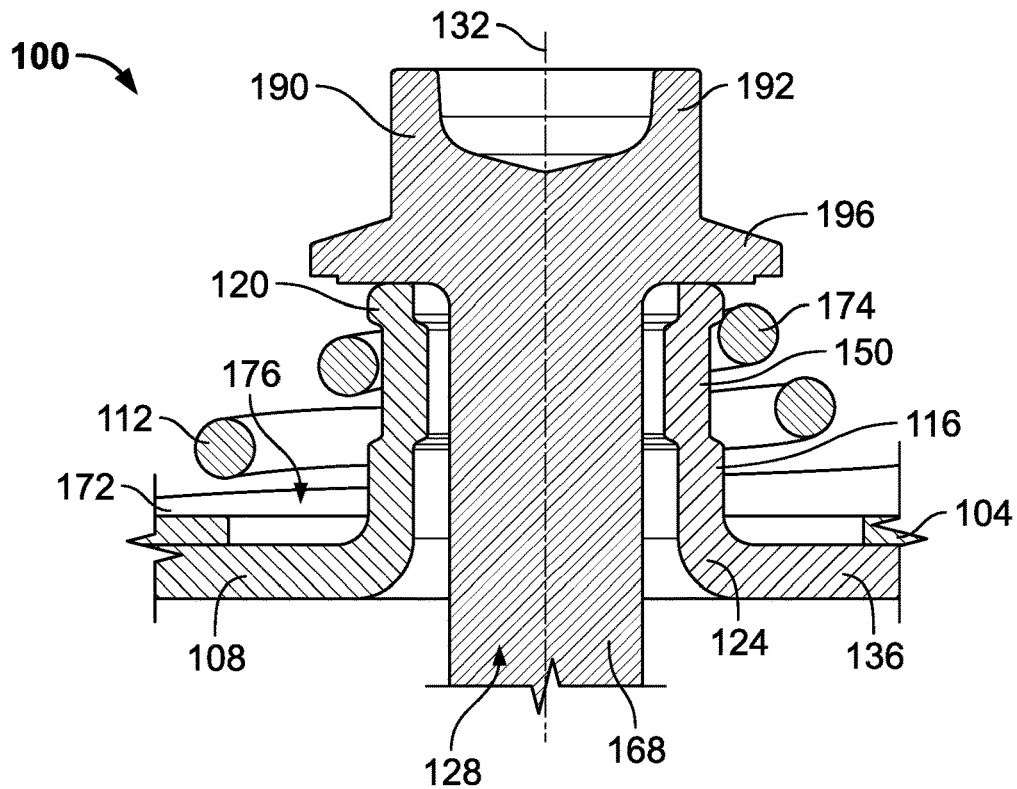
FIG. 6 is a cross-sectional view of the compensating fastener assembly, the surface element, and the fastener of FIG. 5.

Generally, the fastener 190 is inserted so that the head 192 is disposed adjacent the first end 120 of the compression limiter 108, which is best shown in FIG. 6. Still referring to FIG. 6, the fastener 190 in the illustrated embodiment further includes a head flange 196 having a diameter greater than the outer diameter of the first end 120 to allow the head flange 196 to rest against, contact, or abut the first end 120 of the compression limiter 108; however, in some installations, a fastener without a flange may be used, and the head of the fastener may alternatively rest against or abut the first end 120 of the compression limiter. Furthermore, although the fastener 160 in the illustrated embodiment is freely held in the compression limiter 108, in alternative embodiments, the fastener may be retained or pre-captured in the compensating fastener assembly by an intermediate retainer (not shown). For example, the intermediate retainer may be disposed between the fastener shaft and an interior surface of the compression limiter so that the fastener is securely retained within the channel of the compression limiter. Optionally, a washer or a grommet or a gasket may be provided between the fastener 190 and the compression limiter 108, such as between the head flange 196 and the first end 120, or along the shaft 194 within the channel 128, or even between the surface element 104 and the spring 112 or the compression limiter 108.

As discussed above, and as shown in FIG. 6, the compensating fastener assembly 100 is configured such that the spring 112 may be secured to the compression limiter 108. This is particularly useful during installation of the compensating fastener assembly 100 and the surface element 104. For example, the fastener 190 may be inserted into the channel 128 of the compression limiter 108 when the compensating fastener assembly 100 is snapped together, i.e., when the spring 112 is secured to the compression limiter 108. By maintaining a locked position during the insertion of the fastener 190, installation may be eased or improved.

Figure 7:
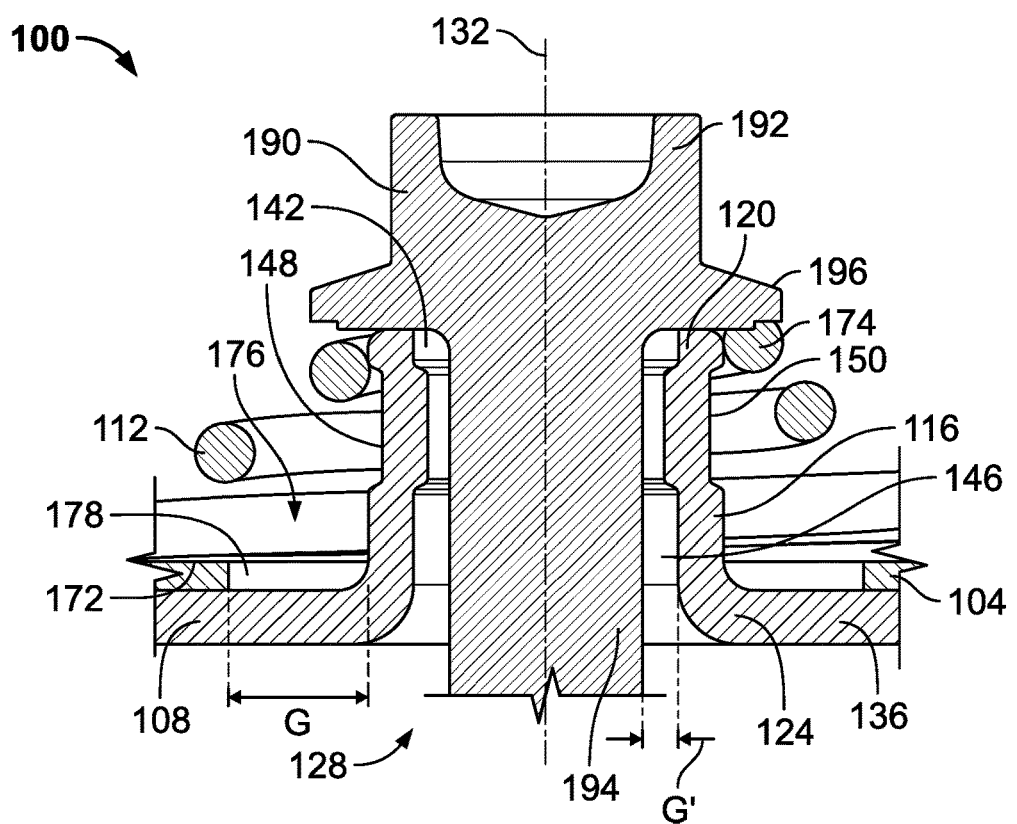
FIG. 7 is a cross-sectional view of the compensating fastener assembly, the surface element, and the fastener of FIG. 5.

With continued reference to FIG. 6, the compensating fastener assembly 100 may remain in the locked position after installation. However, in some applications, such as, e.g., high-load applications, the spring 112 may displace from the recessed region 150, as shown in FIG. 7. Once displaced, the spring 112 may decompress slightly until the second end 174 of the spring 112 contacts or abuts the head flange 196 of the fastener 190. As a result, the spring 112 may contact and be retained/compressed between the head flange 196 of the fastener 190 and the flange 136 of the compression limiter 108. In either position, the compensating fastener assembly 100 is configured to limit the load provided on the surface element 104. More specifically, the load on the surface element 104 is the clamp force provided between the spring 112 and the compression limiter 108. Thus, the fastener load is limited, thereby allowing the fastener 190 to properly stretch in response to load tension.

Furthermore, preferably, the spring 112 provides a low stiffness, e.g., spring constant "k", so that the compensating fastener assembly 100 may accommodate a range of component thicknesses without experiencing a significant change in spring force. For example, the surface element 104 may be replaced with surface elements of varying thicknesses or geometries. A spring having a low spring constant may further allow for varying thermal expansion/contraction rates, and other geometrical changes in response to atmospheric and environmental changes. Moreover, the spring 112 may provide damping capabilities. That is, the compensating fastener assembly 100 may dampen vibrations, which may diminish unwanted vehicle noise.

Figure 8:
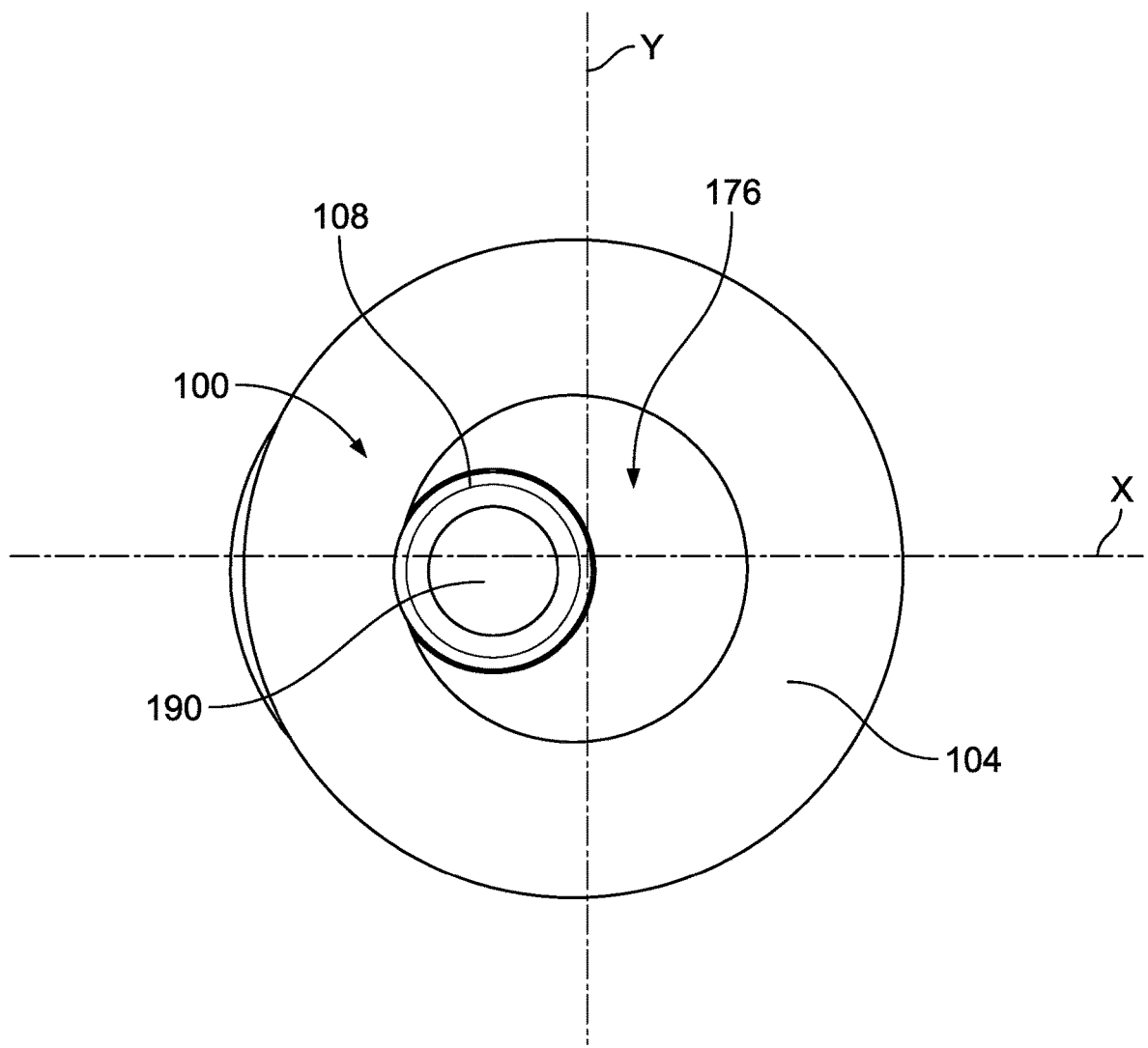
FIG. 8 is a schematic illustrating positional shift of a limiter assembly in relation to a surface element according to an embodiment of the present disclosure.

As illustrated in FIG. 7, an outer gap G is formed between the main body 116 and the inner surface 178 of the opening 176 of the surface element 104. That is, the outer gap G is defined between the exterior surface 148 of the main body 116 and the inner surface 178 of the surface element 104. In the embodiment illustrated, the outer gap G is circumjacent the second end 124 of the main body 116 and extends radially about the longitudinal axis 132. Further, when the fastener 190 is inserted through the channel 128, an inner gap G' is formed between the shaft 194 of the fastener 190 and the inner surface 146 of the main body 116. In the embodiment illustrated, the inner gap G' is less than the outer gap G, and the inner gap G'. By providing an inner gap G' and an outer gap G, the compensating fastener assembly 100 may permit positional shifting (as illustrated in FIG. 8), such as, e.g., slanting or tilting of the fastener 190 within the channel 128 and lateral or radial sliding of the main body 116 within the opening 176 of the surface element 104, thereby preventing damage to the surface element 104 during shipping or use. In addition, the inner gap G' may be defined between the inner recess surface 156 and the shaft 194 of the fastener 190, as illustrated in FIG. 7. However, there may not be an inner gap G' between the shaft 194 and the inner recess surface 156 when assembled, or there may be intermittent inner gaps G' spaced radially between the shaft 194 and the inner recess surface 156 or the interior surface 146 of the main body 116.

Turning now to FIG. 8, the compensating fastener assembly 100 is also configured to provide compensation in multiple directions, e.g., along each of axis X, axis Y, and axis 132 (see, e.g., FIG. 7). By incorporating a spring with a low spring constant, the compensating fastener assembly 100 and the corresponding fastener 190 may translate in various directions relative to the surface element 104, which may diminish stresses on the fastener 190, the surface element 104, and components connected thereto. As a result, premature failure may be mitigated and component lifespan may be extended. Furthermore, the compensating fastener assembly 100 may be configured to correct tolerances or diminish any misalignment of the components and/or fasteners.

Figure 9:
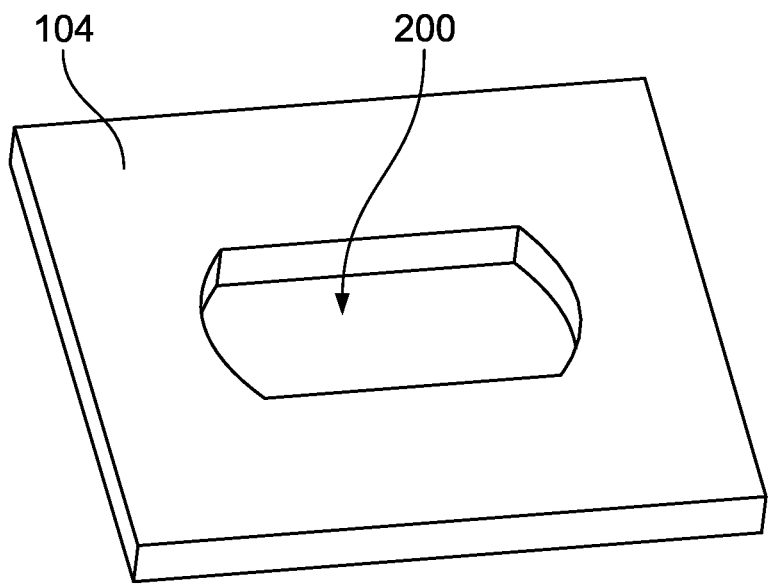
FIG. 9 is an isometric view of a surface element configured for use with a compensating fastener assembly according to an embodiment of the present disclosure.
Figure 10:
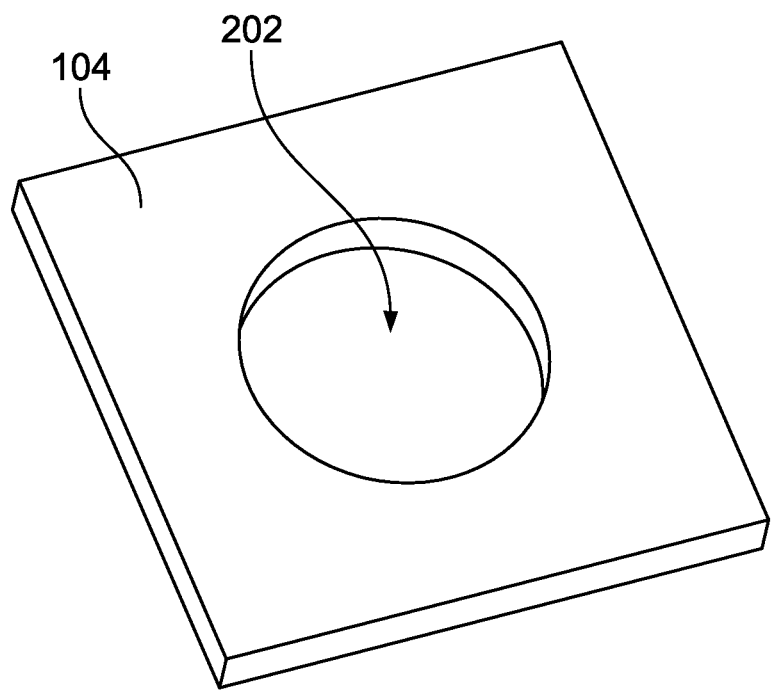
FIG. 10 is an isometric view of another surface element configured for use with a compensating fastener assembly according to an embodiment of the present disclosure.

FIGS. 9 and 10 show two examples of the surface element 104 that may be used with the compensating fastener assembly 100. In FIG. 9, the surface element 104 includes a slotted opening 200, whereas FIG. 10 illustrates the surface element 104 with a circular opening 202. However, surface elements according to alternative embodiments of the present disclosure may have openings of any shape, such as, e.g., square, triangular, oval, hexagonal, etc. In any instance, referring again to FIG. 8, the compensating fastener assembly 100 may allow for moderate or incremental movement of the compensating fastener assembly 100 and fastener 190 in any of the X axis, Y axis, and/or axis 132 (see, e.g., FIG. 7) relative to the surface element 104.

Figure 11:
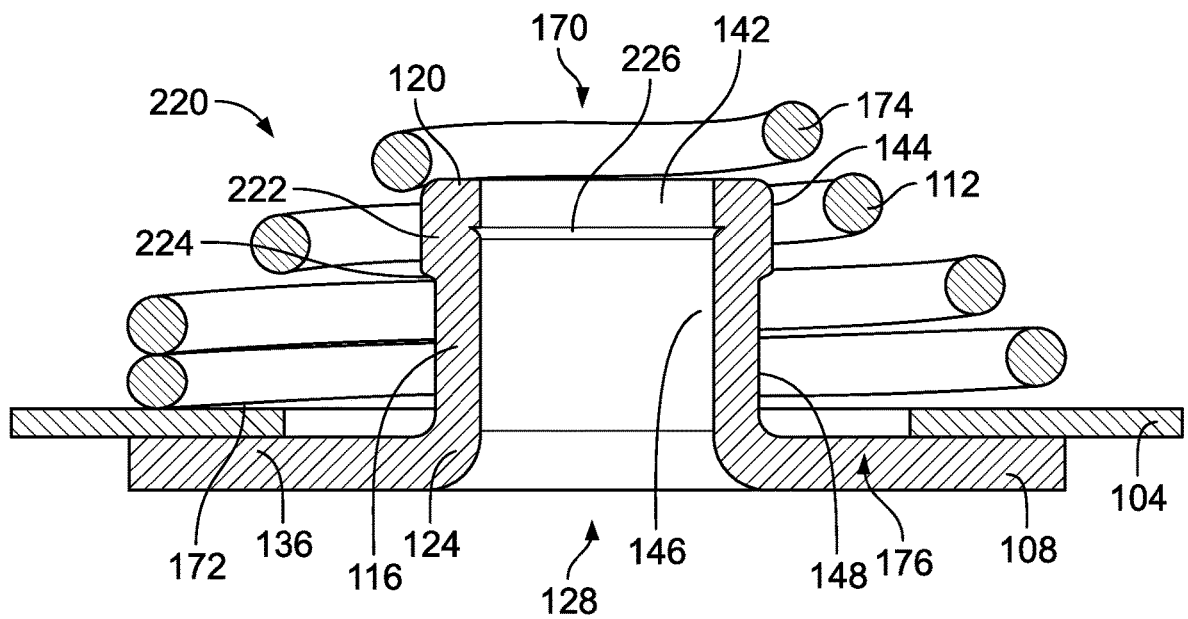
FIG. 11 is a cross-sectional view of a compensating fastener assembly, which includes a compression limiter and a spring, being secured to a surface element according to another embodiment of the present disclosure.
Figure 12:
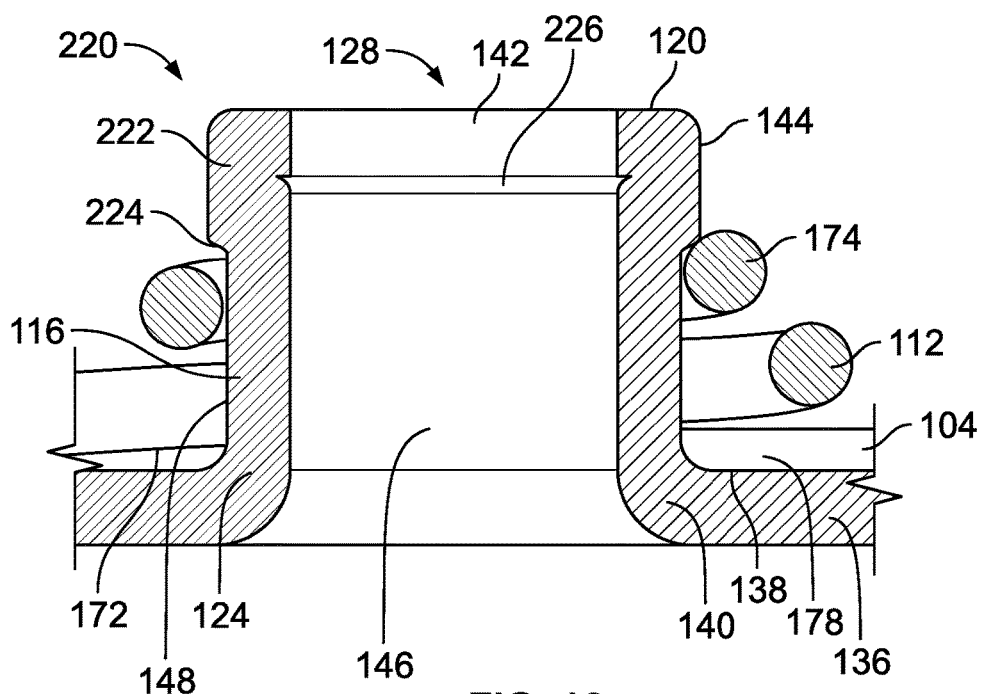
FIG. 12 is a cross-sectional view of the compensating fastener assembly of FIG. 11 secured to the surface element.

FIGS. 11 and 12 illustrate side cross-sectional views of a compensating fastener assembly 220 according to another embodiment of the present disclosure. The compensating fastener assembly 220 is similar to the compensating fastener assembly 100 shown in FIGS. 1-7, with similar elements identified using like reference numerals, except that the compression limiter 108 includes a different retention feature. More specifically, rather than the recessed region 150 shown in FIG. 1, the compression limiter 108 includes a raised region 222 adjacent the first end 120 thereof, and the raised region 222 includes an outer rim 224 that extends inwardly toward the outer surface 148 of the main body 116, such that the outer rim 224 is spaced apart from the flange 136 and faces the top surface 138 of the flange. The raised region 222 also includes an inner rim 226 formed within the channel 128 and disposed between closer to the first end 120 than the upper rim 224. In the embodiment illustrated, the raised region 222 extends less than half of a distance between the first end 120 and the second end 124 of the main body 116. Optionally, the raised region 222 may extend approximately half of the distance between the first end 120 and the second end 124, or even approximately more than half of the distance between the first 120 and the second end 124 of the main body 116.

As illustrated in FIGS. 11 and 12, the first end 120 of the compression limiter 108 and the raised region 222 have a larger outer diameter than a remainder of the main body 116 of the compression limiter 108. When assembled, the second end 174 of the spring 112 may snap over the raised region 222 to be securely held beneath the outer rim 224, as shown in FIG. 12. Accordingly, an inner diameter of the spring 112 at the second end 174 is preferably slightly smaller than an outer diameter of the raised region 222 on the main body 116, and the inner diameter of the spring 112 at the second end 174 is preferably greater than or equal to an outer diameter of a remainder of the main body 116. Optionally, as similarly illustrated in the example of FIG. 7, the spring 112 may slide over the outer rim 224 and along the first end 120 until it abuts the head flange 196 of the fastener 190. In this way, the spring 112 may be compressed between the fastener 190 and the flange 136, or between the fastener 190 and the surface element 104.

Figure 13:
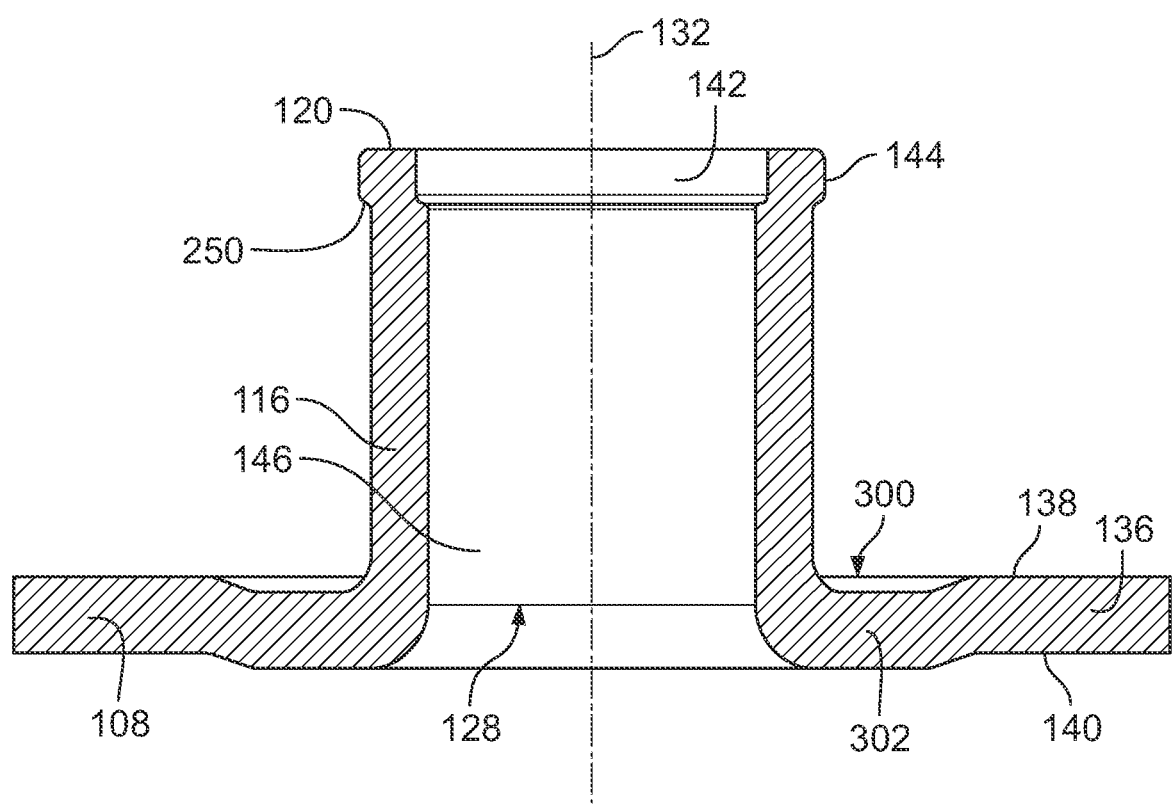
FIG. 13 is a cross-sectional view of another embodiment of a compression limiter.

As illustrated in FIG. 13, the compression limiter 108 may not include a raised region 222 or a recessed region 150. Instead, the main body 116 may include only a first end 120 defining a greater outer diameter and inner diameter than the remainder of the main body 116 and an outer rim 250 similar to the outer rim 224 of FIGS. 11 and 12. When assembled, the second end 174 of the spring 112 may snap over the first end 120 to be securely held beneath the outer rim 250, as shown in FIG. 12. Optionally, as similarly illustrated in the example of FIG. 7, the spring 112 may slide over the outer rim 250 and along the first end 120 until it abuts the head flange 196 of the fastener 190. In this way, the spring 112 may be compressed between the fastener 190 and the flange 136, or between the fastener 190 and the surface element 104.

As illustrated in FIG. 13, the flange 136 may include an annular depression area 300 proximate the second end 124 of the main body 116 and extending in a direction parallel to a direction of the longitudinal axis 132 and further extending radially about the second end 124 to a distance less than half of the outer diameter of the flange 136. The flange 136 may also include a sloped transition area 302 along a periphery of the depression area 300, such that the sloped transition area 302 defines an angle between the remainder of the flange 136 and the depression area 300. That is, the depression area 300 sits at least partially below the remainder of the flange 136, and the top surface 138 and bottom surface 140 within the depression area 300 are located below the top surface 138 and the bottom surface 140 of the remainder of the flange 136. In other examples, the top surface 138 of the flange may include an annular protrusion or hub region instead of the depression area 300, such that only the bottom surface 140 includes the sloped transition area 302 between the hub region and the remainder of the flange 136. In this example, the flange 136 has a greater wall thickness, i.e., a distance between the bottom surface 140 and the top surface 138, in the hub region than in the remainder of the flange 136.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative embodiments of the present disclosure. The claims are to be construed to include alternative embodiments to the extent permitted by the prior art.

Various features of the disclosure are set forth in the following claims.

The invention claimed is:

1. A compensating fastener assembly configured to secure a fastener to a surface element, the compensating fastener assembly comprising:
   a compression limiter having a main body and a flange, the main body defining a channel and a longitudinal axis; and
   a spring defining a central passage,
   wherein the central passage of the spring is configured to receive the main body of the compression limiter such that a first end of the spring is configured to be disposed adjacent the flange of the compression limiter,
   wherein the flange includes an annular depression area,
   wherein the surface element includes an opening, and
   wherein the main body of the compression limiter is configured to be inserted into the opening, the flange is configured to abut the surface element, and the spring is configured to receive the compression limiter so that the surface element is disposed between the first end of the spring and the flange of the compression limiter.

2. The compensating fastener assembly of claim 1, wherein the main body of the compression limiter includes a recessed region, and wherein a second end of the spring is configured to be received by the recessed region.

3. The compensating fastener assembly of claim 2, wherein the spring is configured to be compressed between the flange and a retention feature of the main body of the compression limiter.

4. The compensating fastener assembly of claim 1, wherein the compensating fastener assembly is configured to receive a fastener in the channel of the compression limiter.

5. The compensating fastener assembly of claim 4, wherein the spring is configured to contact and be retained between the fastener and the flange.

6. The compensating fastener assembly of claim 1, the spring is a conical wire spring, and wherein the first end of the spring has an outer diameter greater than an outer diameter of a second end of the spring.

7. A fastener assembly, comprising:
   a compression limiter having a main body extending between a first end and a second end opposite the first end, a flange extending radially outward from the second end, and an outer rim spaced apart from the flange and facing a top surface of the flange; and
   a spring defining a central passage between an upper end and a lower end opposite the upper end, wherein the spring is configured to be axially aligned with the main body and the upper end of the spring is configured to be disposed adjacent the outer rim of the compression limiter, and wherein a surface element is disposed between the lower end of the spring and the flange of the compression limiter, and wherein the lower end of the spring is located proximate an opening of the surface element.

8. The fastener assembly of claim 7, wherein the first end of the main body has an outer diameter that is greater than an outer diameter of a remainder of the main body.

9. The fastener assembly of claim 7, wherein the spring is compressed between the outer rim and the surface element.

10. The fastener assembly of claim 7, wherein a fastener includes a head and a shaft extending from the head, the shaft being configured to be at least partially inserted through the compression limiter such that a gap is formed between the shaft and the compression limiter.

11. The fastener assembly of claim 10, wherein the upper end of the spring is configured to abut the head of a fastener.

12. A fastener assembly, comprising:
a compression limiter having a main body defining a channel therethrough and a flange extending radially outwardly from an end of the main body; and
a spring having an upper end and a lower end,
wherein the upper end of the spring is configured to be disposed adjacent the main body and a surface element is configured to be disposed between the spring and the compression limiter,
wherein the channel includes an upper ramp and a lower ramp, and
wherein the upper ramp extends inwardly relative to a longitudinal axis at an angle from an interior surface and the lower ramp extends outwardly relative to the longitudinal axis at an angle between an inner recessed surface and the interior surface of the main body.

13. The fastener assembly of claim 12, wherein the main body of the compression limiter is configured to be received through an opening of the surface element.

14. The fastener assembly of claim 13, wherein a gap is formed between the main body and an inner surface of the opening.

15. The fastener assembly of claim 14, wherein a fastener is configured to be inserted through the channel of the compression limiter and an outer diameter of the fastener is greater than an inner diameter of the channel.

16. The fastener assembly of claim 15, wherein the fastener includes a shaft extending from a head, the shaft being configured to be at least partially inserted through the channel of the main body such that a gap is formed between the shaft and the main body.

17. The fastener assembly of claim 16, wherein the spring is configured to be compressed between the head of the fastener and the flange of the compression limiter.

18. The fastener assembly of claim 12, wherein the spring is configured to be axially aligned with the channel of the compression limiter.

* * * * *